US005758065A

United States Patent [19]
Reams et al.

[11] Patent Number: 5,758,065
[45] Date of Patent: May 26, 1998

[54] SYSTEM AND METHOD OF ESTABLISHING ERROR PRECEDENCE IN A COMPUTER SYSTEM

[75] Inventors: Byron L. Reams; Edward A. McDonald, both of Lexington, S.C.

[73] Assignee: NCR Corporation, Dayton, Ohio

[21] Appl. No.: 565,520

[22] Filed: Nov. 30, 1995

[51] Int. Cl.[6] ........................................................ G06F 11/00
[52] U.S. Cl. .............................. 395/185.01; 395/185.1; 395/183.19; 395/185.09
[58] Field of Search ..................... 395/182.18, 185.1, 395/183.19, 183.21, 185.01, 185.09, 306; 371/40.3

[56] References Cited

U.S. PATENT DOCUMENTS

| | | | |
|---|---|---|---|
| 3,646,516 | 2/1972 | Flinders et al. | 340/146.1 |
| 3,649,963 | 3/1972 | Holm et al. | 340/146.1 |
| 3,810,577 | 5/1974 | Drescher et al. | 235/153 AC |
| 4,462,099 | 7/1984 | Braun | 371/22 |
| 4,613,858 | 9/1986 | Davidson et al. | 340/825.5 |
| 4,627,054 | 12/1986 | Cooper et al. | 371/11 |
| 4,679,195 | 7/1987 | Dewey | 371/29 |
| 4,821,267 | 4/1989 | Druegh et al. | 371/22 |
| 5,155,843 | 10/1992 | Stamm et al. | 395/575 |
| 5,212,690 | 5/1993 | Löw | 370/108 |
| 5,267,251 | 11/1993 | Lenoir et al. | 371/57.2 |
| 5,313,627 | 5/1994 | Amini et al. | 395/575 |
| 5,337,313 | 8/1994 | Buchholz et al. | 370/94.1 |
| 5,377,198 | 12/1994 | Simpson et al. | 371/22.3 |
| 5,444,859 | 8/1995 | Baker et al. | 395/182.18 |
| 5,577,201 | 11/1996 | Chan et al. | 395/185.1 |

OTHER PUBLICATIONS

Dahbura et al., "An Optimal Test Sequence for the JTAG/IEEE p. 1149.1 Test Access Port Controller", 1989, pp. 55–62, IEEE.

*Primary Examiner*—Phung M. Chung
*Assistant Examiner*—Scott T. Baderman
*Attorney, Agent, or Firm*—Paul W. Martin

[57] ABSTRACT

A system and method of establishing error precedence in a computer system which determine a first error to occur. The system determines the order of occurrence of errors in a computer system and includes error precedence modules which record and order errors that occur on a first bus with error that occur on a second bus. Diagnostic processing circuitry reads the errors stored within the error precedence modules and their order of occurrence and determines which bus the first error occurred on.

3 Claims, 6 Drawing Sheets

SYSTEM AND METHOD OF ESTABLISHING ERROR PRECEDENCE IN A COMPUTER SYSTEM

BACKGROUND OF THE INVENTION

The present invention relates to computer systems, and more specifically to a system and method of establishing error precedence in a computer system.

Recording errors in computer systems can help a technician determine possible causes for the errors and replace faulty components. Lack of error precedence information makes diagnoses of errors in computer systems difficult, especially for errors that result from other errors.

This problem is magnified in a computer system having multiple buses, such as computers having a split transaction bus architecture. Cause and effect relationships are difficult to determine, especially for errors on one bus that cause errors on another bus.

Therefore, it would be desirable to provide a system and method of establishing error precedence in a computer system. It would also be desirable to provide a system and method of establishing error precedence in a computer system having multiple buses.

SUMMARY OF THE INVENTION

In accordance with the teachings of the present invention, a system and method of establishing error precedence in a computer system are provided.

The system determines the order of occurrence of errors in a computer system and the first error to occur. The system includes error precedence modules which record and order errors that occur on a first bus with error that occur on a second bus. Diagnostic processing circuitry reads the errors stored within the error precedence modules and their order of occurrence and determines which bus the first error occurred on.

The system has particular application to multi-processor computer systems having a first and second system buses and node buses. Such a diagnostic system includes a first error precedence modules coupled between the first and second system buses for recording and ordering errors that occur on the first and second system buses. Second error precedence modules coupled between the node buses and the system buses record and order errors that occur on the system buses and their node buses. Third error precedence modules coupled between the node buses and the processor buses record and order errors that occur on the node buses and their processor buses. Diagnostic processing circuitry reads the errors stored within the first, second, and third error precedence modules and determines a first error to occur.

It is accordingly an object of the present invention to a system and method of establishing error precedence in a computer system.

It is another object of the present invention to provide a system and method of establishing error precedence in a single-processor computer system which determines the order of occurrence of errors.

It is another object of the present invention to provide a system and method of establishing error precedence in a multi-processor computer system which determines the order of occurrence of errors.

It is another object of the present invention to provide a system and method of establishing error precedence in a multi-processor computer system which determines the order of occurrence of errors from different buses.

It is another object of the present invention to provide a system and method of establishing error precedence in a uni-processor computer system which determines the order of occurrence of errors from different buses.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1A:
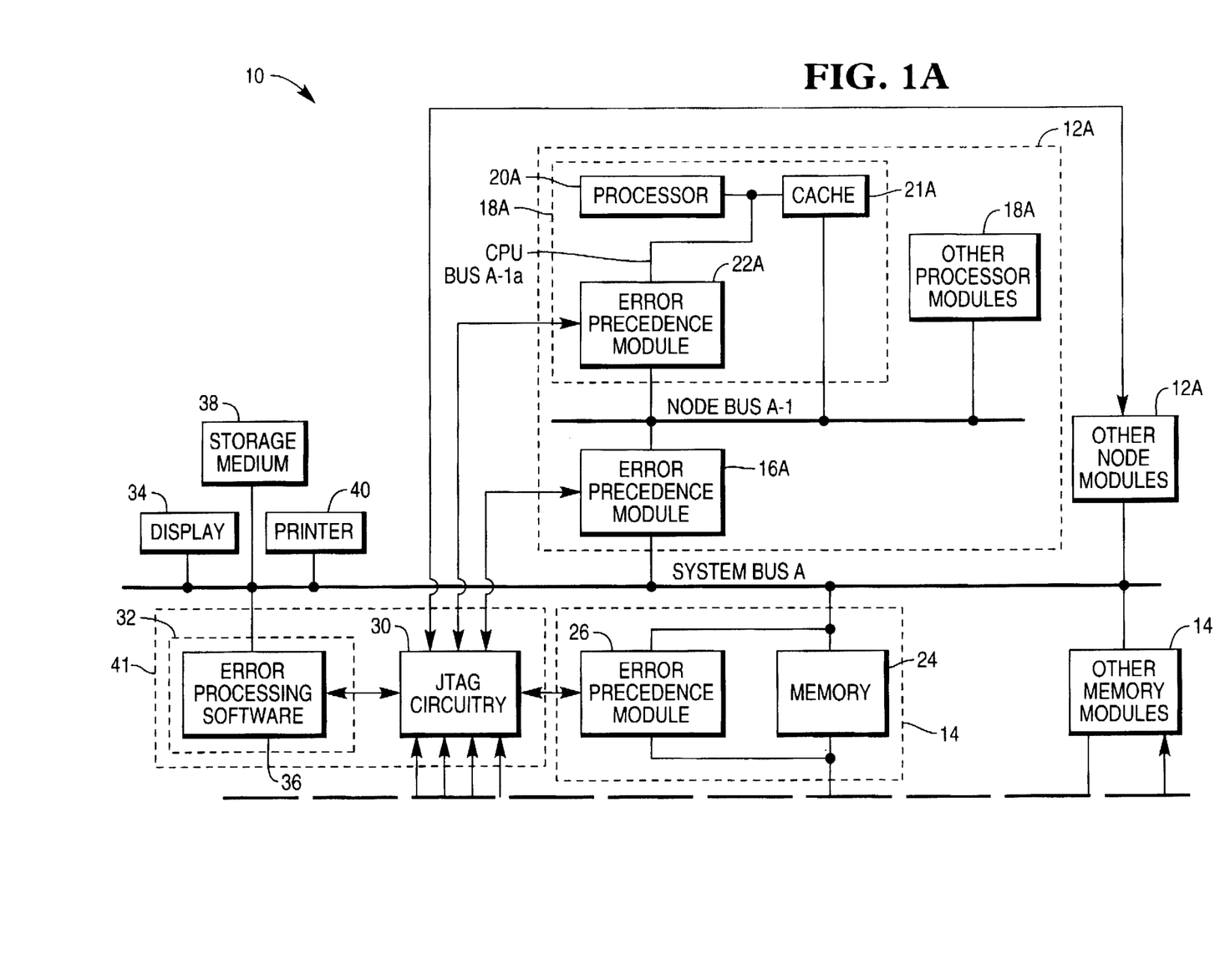
FIGS. 1A and 1B form a block diagram of a computer system which includes the error precedence determining system of the present invention.
Figure 1B:
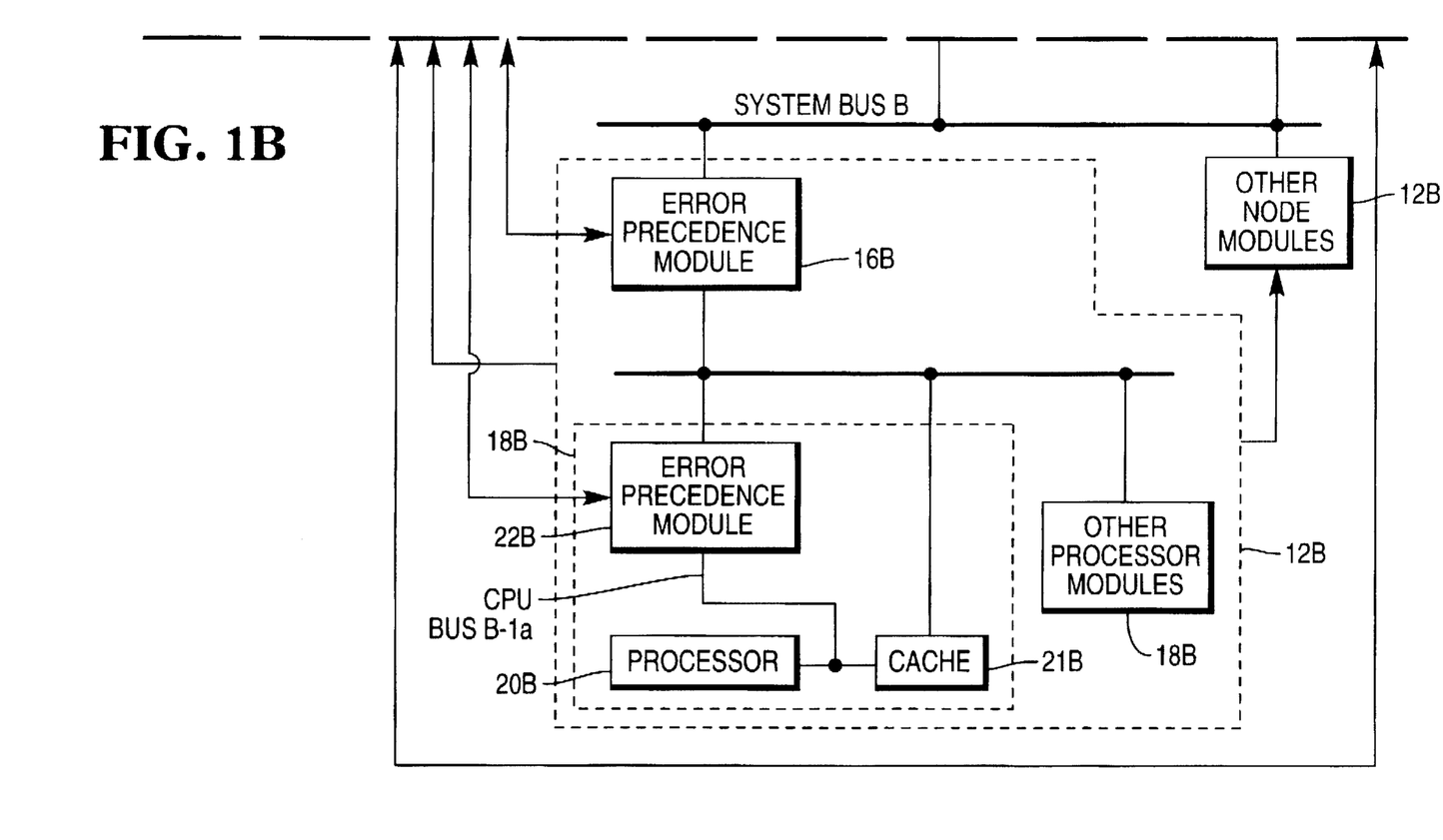

Referring now to FIGS. 1A and 1B, computer system 10 primarily includes System Buses A and B, node modules 12A and 12B, and memory modules 14.

Node modules 12A and 12B each include a node bus. Here, Node Buses A-1 and B-1 are shown, although any number "n" of node buses is envisioned. Between System Bus A and Node Buses A-1 through A-n are error precedence modules 16A. Between System Bus B and Node Buses B-1 through B-n are error precedence modules 16B.

The Node Buses each support a plurality of processor modules. Node Bus A-1 supports processor modules 18A, and Node Bus B-1 supports processor modules 18B.

Each processor module includes a CPU bus which connects the processor to its corresponding cache. The first processor module on Node Bus A-1 includes CPU Bus A-1-a. The first processor module on Node Bus B-1 includes CPU Bus B-1-a. Each of processor modules 18A includes a processor 20A, a cache 21A, and error precedence module 22A. Each of processor modules 18B includes a processor 20B, a cache 21B, and error precedence module 22B.

Memory modules 14 each include a memory 24 and an error precedence module 26.

Error precedence modules 16A, 16B, 22A, 22B, and 26 detect and store errors that occur within system 10. There are three types of error statuses. The first type of error status is the result of an internal error that causes no error indication on the external interface. The second type of error status is the result of an external interface error which ideally would be detected by each agent attached to that external interface. The third type of error status is an interrupt propagation in which the agent is simply propagating the error interrupt from a higher level of the hierarchy.

For every error, no matter where it occurs, error precedence modules 16A, 16B, 22A, 22B, and 26 propagate an indication that an error has occurred all the way out to either System Bus A or System Bus B. Error precedence modules 26 are responsible for ordering errors between System Buses A and B. Error precedence modules 16A are responsible for ordering errors between System Bus A and Node Bus A-1. Error precedence modules 16B are responsible for ordering errors between System Bus B and Node Bus B-1. Error precedence modules 22A are responsible for ordering errors between CPU Bus A-1-a and Node Bus A-1. Finally, error precedence modules 22B are responsible for ordering errors between CPU Bus B-1-a and Node Bus B-1.

JTAG circuitry 30 provides access to the stored error information within error precedence modules 16A, 16B, 22A, 22B, and 26. Boundary-scan logic circuitry is commonly added to integrated circuits for testing and monitoring the integrated circuits. A discussion of boundary-scan logic can be found in the following publications: (1) IEEE standard 1149.1, entitled, "IEEE Standard Test Access port and Boundary-Scan Architecture", dated May 21, 1990; and (2) "A Standard Test Bus and Boundary Scan Architecture", by Lee Whetsel, TI Technical Journal, July–August 1988. These publications are hereby incorporated by reference.

Diagnostic processing circuitry 41 includes diagnostic processor 32, which executes error processing software 36. Of course, the present invention also envisions that diagnostic processing circuitry 41 can be implemented only as hardware, and may or may not be connected to the system bus as shown in FIG. 1A. Error processing software 36 uses JTAG circuitry 30 to access the stored error information within error precedence modules 16A, 16B, 22A, 22B, and 26. Error processing software 36 then determines the first error to occur among many errors that may have occurred within system 10. Error processing software 36 may display error precedence information on display 34, record the error precedence information in storage medium 38 for later review by technicians, or print the error precedence information on printer 40.

Figure 2:
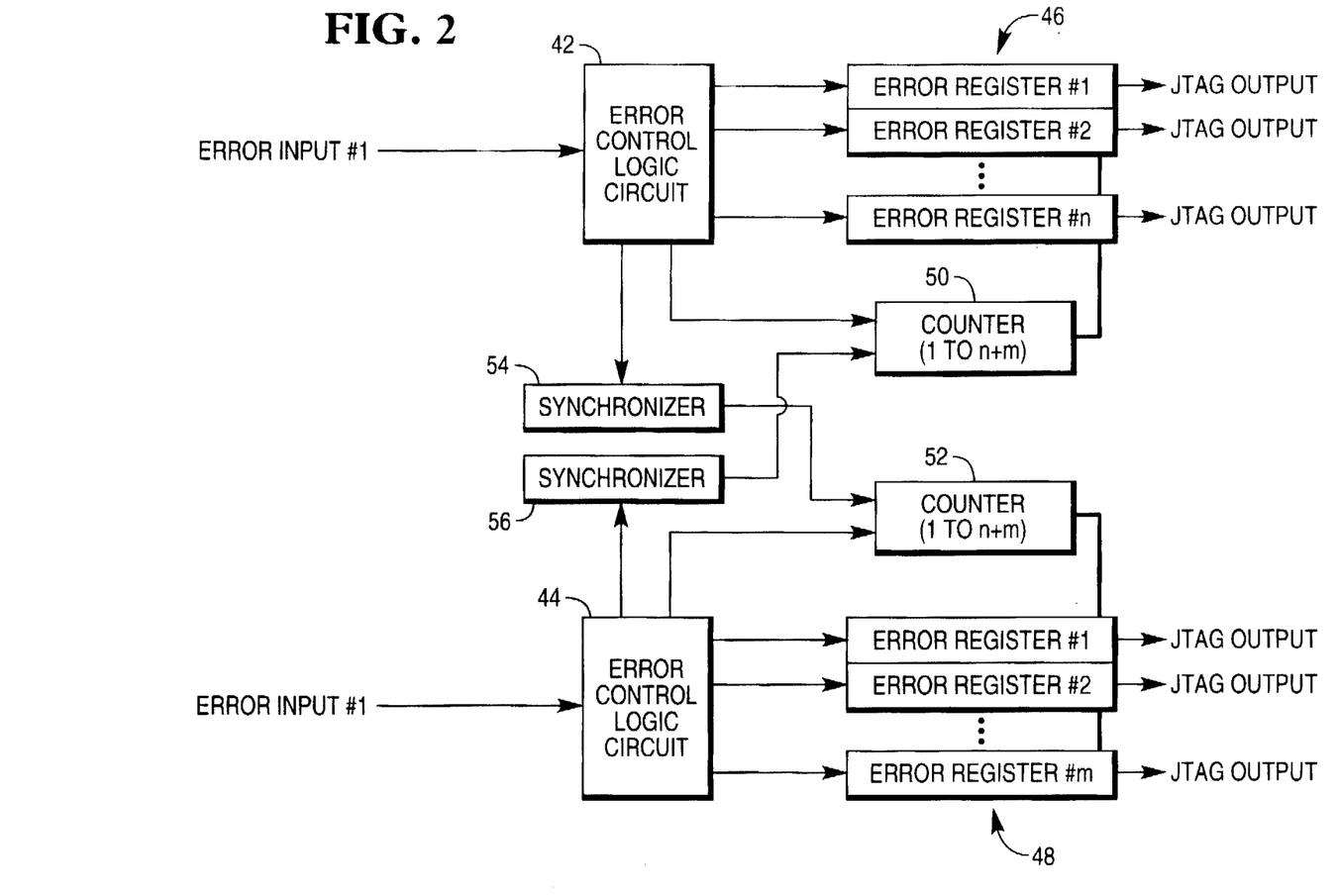
FIG. 2 is a block diagram of an error precedence module within the system of FIGS. 1A and 1B.

Turning now to FIG. 2, error precedence modules 16A, 16B, 22A, 22B, and 26 are shown in more detail. Each error precedence module includes error control logic circuits 42 and 44, register groups 46 and 48, counters 50 and 52, and synchronizers 54 and 56.

Error control logic circuit 42 detects errors at error input 1 and latches the error information (which includes the type of error, the source of the error, and the current count) in the lowest numbered unused error register within register group 46. Error control logic circuit 42 then increments its own counter 50 and sends an increment to counter 52 on the other side. The increment must be synchronized, since each of sides A and B operate asynchronously. As multiple errors occur, the count that is latched in each error register of register group 46 will indicate the relative order of occurrence of those errors.

The error count is only necessary to order the errors in one register group with respect to the errors in another register group. If all the errors occurred on only one of sides A or B and were recorded only in one of the register groups, then the count is redundant information since the register group itself orders the errors within the group. The count allows one to determine the relative ordering of errors when errors occur on both of sides A and B, i.e. errors on one side can be ordered with respect to errors on the other side.

Similarly, error control logic circuit 44 detects errors at error input 2 and latches the error information in the lowest numbered unused error register within register group 48. Error control logic circuit 44 then increments its own counter 52 and sends an increment (which must be synchronized) to counter 50 on the other side. As multiple errors occur, the count that is latched in each error register of register group 48 will indicate the relative order of occurrence of those errors.

Register groups 46 and 48 each contain a plurality of error registers for storing error information in the sequence it occurs. Register group 46 includes error registers 1-n, and register group 48 includes error registers 1-m.

Counters 50 and 52 provides a reference count for the errors as they occur. This reference count is stored with the error type and source information.

Synchronizer 54 synchronizes error control logic circuit 42 with counter 52 for the purpose of allowing circuit 42 to increment counter 52. The two sides of each error precedence module operate asynchronously. Similarly, synchronizer 56 synchronizes error control logic circuit 44 with counter 50 for the purpose of allowing circuit 44 to increment counter 50. Synchronizers 54 and 56 are only needed if the two sides A and B are operated asynchronously to each other. Another approach is to provide asynchronous logic.

When error processing software 36 reads the error registers in groups 46 and 48 via their JTAG ports it determines the type, order, and source of each error.

In the extremely rare case of unrelated errors occurring simultaneously or near simultaneously on a Node Bus (e.g., Node Bus A-1) and a System Bus (e.g., System Bus A), it is possible that error processing software 36 would have to do additional error parsing to determine which occurred first.

Figure 3A:
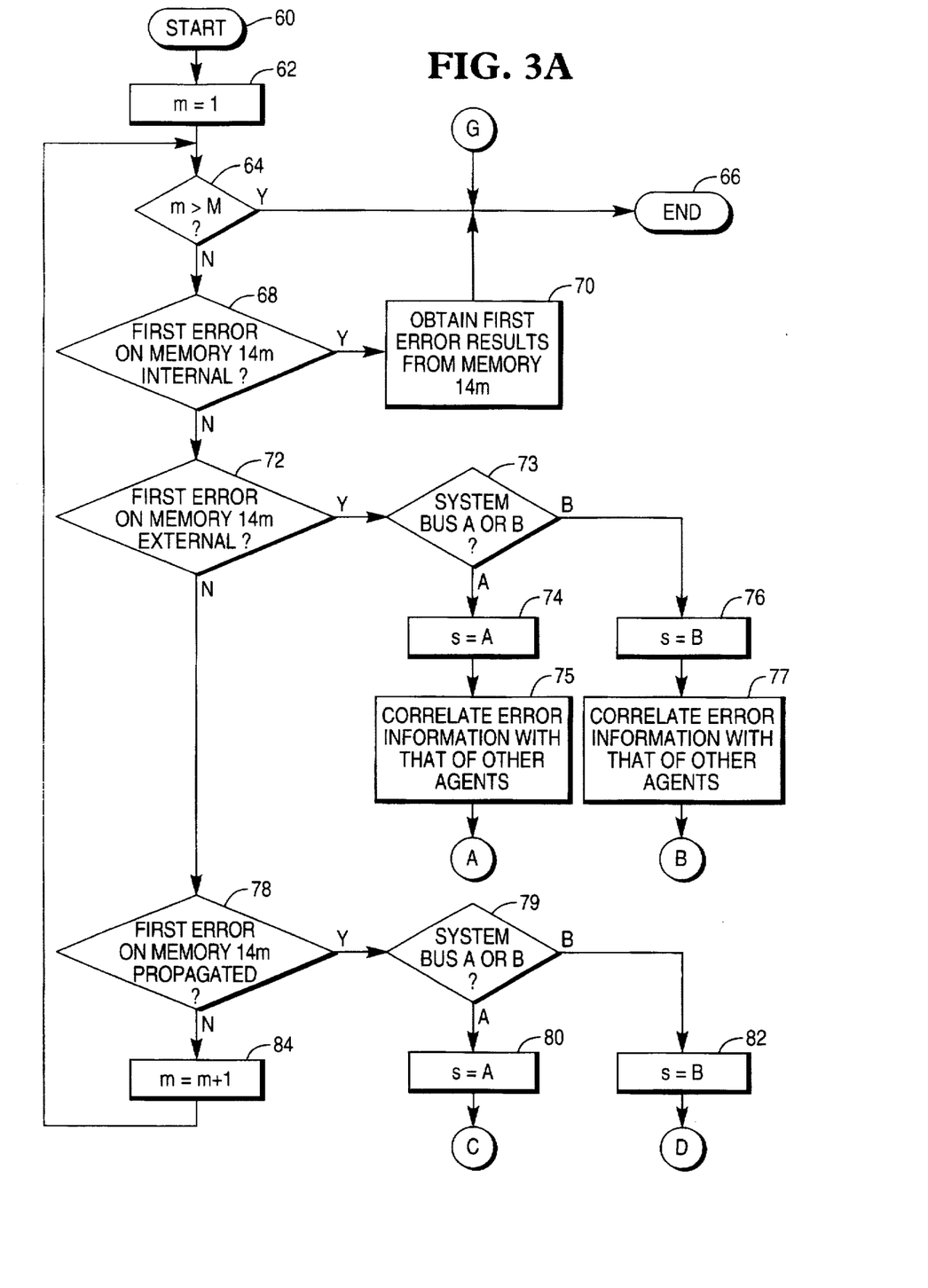
FIGS. 3A, 3B, and 3C form a flow diagram illustrating the operation of the error precedence determining system in determining the relative order of errors.
Figure 3B:
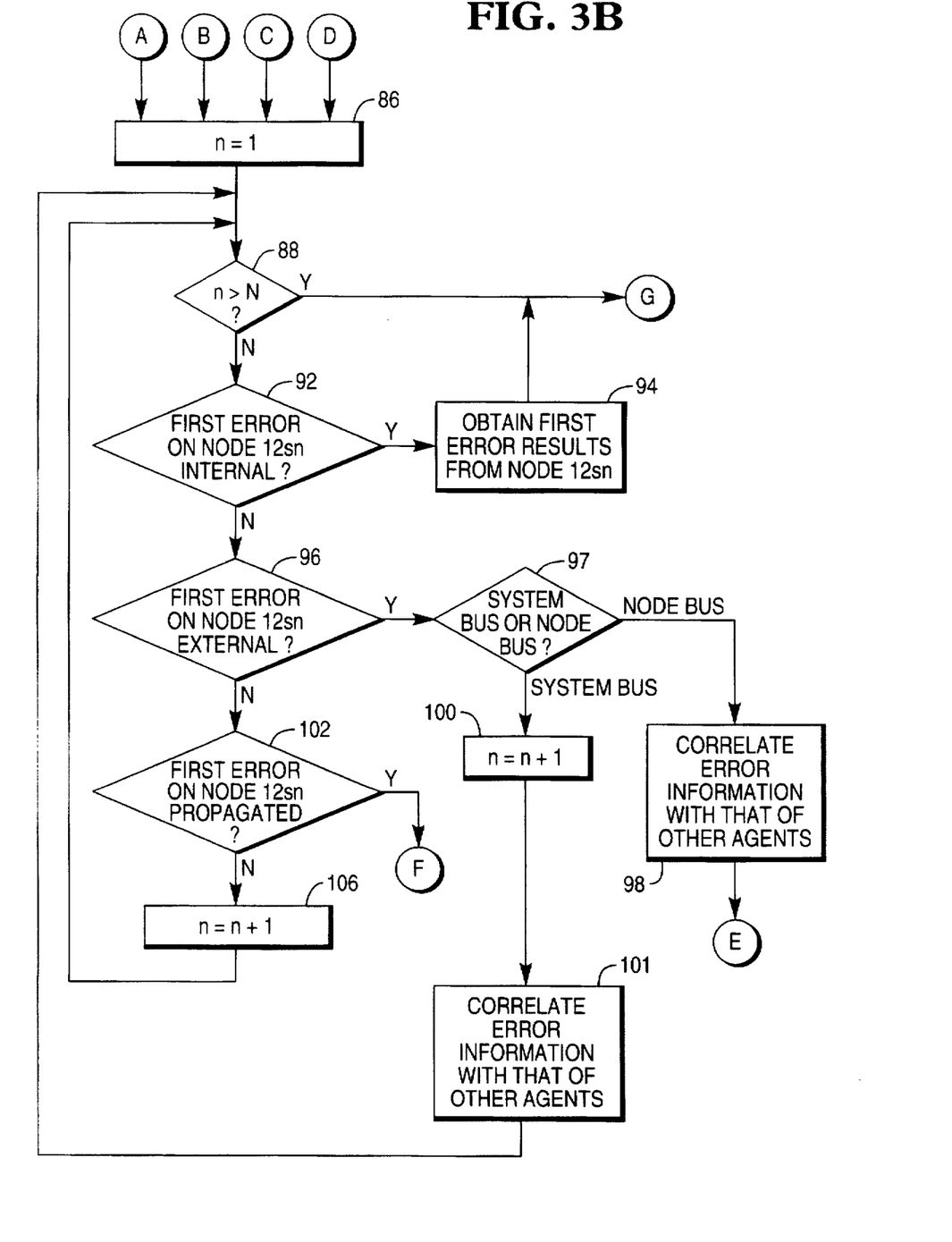
Figure 3C:
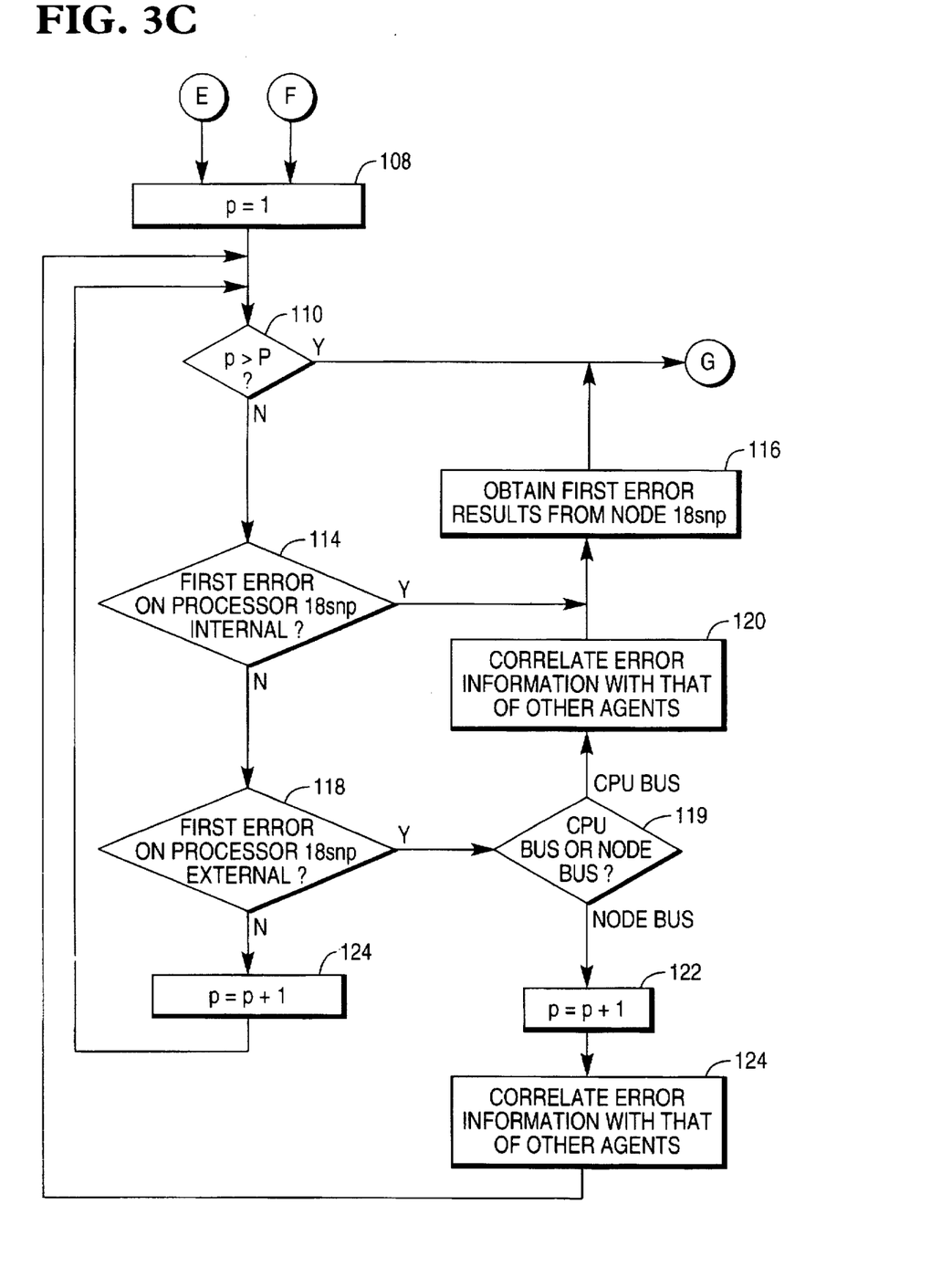

Turning now to FIGS. 3A–3C, the operation of error precedence software 36 is explained in more detail. As an example, suppose a data parity error occurs on one of the CPU buses (e.g., CPU Bus A-1-a). The data parity error generates a node error interrupt (N_ERRINT) on Node Bus A-1, which in turn generates a system error interrupt (V_ERRINT) on System Bus A.

Each of modules 26, 16A and 16B, and 22A and 22B is capable of detecting an error condition and generating an error response to that error condition. When an agent drives data on one of System Buses A and B, it also generates corresponding Data Parity bits and drives those on the bus as well. Other agents, including modules 26, 16A and 16B, observe the Data and Data Parity. They each generate their own Data Parity bits corresponding to the Data and compare the generated parity with actual parity on the bus. When the generated and actual parity don't agree, that agent has detected an error condition. That agent asserts an error signal which is observed by all the other agents on that bus. These agents may, or may not have detected the error condition of bad parity, but they all observe the Data Parity error signal.

Suppose one of modules 22A observes an error condition of bad parity and asserts the Data Parity error signal (this is an example of an interface error). Other modules 22A and modules 16A, and 26 do not observe the error condition of bad parity, but they do observe the assertion of the Data Parity error signal. The one module 22A observed an error condition, while the other modules are an observer of the error interrupt. Error interrupts are only propagated down the hierarchy, that is, from CPU Bus to Node Bus to System Bus. Once the interrupt is propagated to the System Bus, it is not necessary to propagate it back up the hierarchy to reach all the other modules in the system.

FIGS. 3A–3C illustrate how error precedence software 36 determines the source of the first error in system 10. Software 36 reads error status information and proceeds to determine the source of the first error. The source of the first error has been determined when the software reaches a "Done" block.

Thus, FIG. 3A begins with START 60.

In step 62, error precedence software 36 initializes a memory module counter m to a value of '1' for polling error precedence modules 26 to determine which system bus, A or B, saw the first error. The effects of any error are propagated all the way out to the System Buses A and B. No matter where in system 10 an error occurs, eventually, an error interrupt will be seen on one of System Buses A or B.

In step 64, error precedence software 36 determines whether memory module counter m is greater than the number M of memory modules 14. If so, the method ends in step 66. If not, the method proceeds to step 68.

In step 68, error precedence software 36 determines whether the first error in the current memory module 14m to be examined is internal. If the first error is internal, then error precedence software 36 obtains the first error results from memory 14m in step 70, and the method ends in step 66, and the first error results are obtained from memory module 14m. If not, the method proceeds to step 72.

In steps 72 and 73, error precedence software 36 determines whether the first error in the current memory module 14m is external and which System Bus saw the error first. If the first error is external and System A saw the error first, the method proceeds to step 74 in which bus variable s is initialized to 'A'.

In step 75, error precedence software 36 correlates the error information with that of other agents on the same interface that observed the same error condition. The method proceeds to step 86 of FIG. 3B.

Returning to steps 72 and 73, if the first error is external and System B saw the error first, the method proceeds to step 76 in which bus variable s is initialized to 'B'.

In step 77, error precedence software 36 correlates the error information with that of other agents on the same interface that observed the same error condition. The method proceeds to step 86 of FIG. 3B.

If the first error in the current memory module 14 is not internal or external, the method proceeds to step 78.

In steps 78 and 79, error precedence software 36 determines whether the first error in the current memory module 14m is propagated and which System Bus saw the error first. If the first error is propagated and System A saw the error first, the method proceeds to step 80 in which bus variable s is initialized to 'A'. The method proceeds to step 86 of FIG. 3B.

Returning to steps 78 and 79, if the first error is propagated and System B saw the error first, the method proceeds to step 82 in which bus variable s is initialized to 'B'. The method proceeds to step 86 of FIG. 3B.

Returning to step 78, if the first error in the current memory module 14m is not internal, external, or propagated, the method proceeds to step 84 where memory module counter m is incremented, and the method returns to step 64.

With reference to FIG. 3B, error precedence software 36 examines error precedence modules within node modules on System Bus A or System Bus B.

In step 86, a node module counter n is initialized to '1'.

In step 88, error precedence software 36 determines whether the node module counter n is greater than the number N of nodes 12s. If so, the method ends in step 66. If not, the method proceeds to step 92.

In step 92, error precedence software 36 determines whether the first error in the current node module 12sn to be examined is internal. If the first error is internal, then error precedence software 36 obtains the first error results from node 12sn and the method ends in step 66. If not, the method proceeds to step 96.

In steps 96 and 97, error precedence software 36 determines whether the first error in the current node module 12sn is external, and whether the System Bus or Node Bus saw the error first. If the first error is external and the Node Bus saw the error first, error precedence software 36 correlates error information with that of other agents. The current error precedence module 22sn observed an external error on the interface between hierarchies. The method proceeds to step 108 of FIG. 3C.

If the first error is external and the System Bus saw the error first, the method proceeds to step 100 in which the node module counter n is incremented.

In step 101, error precedence software 36 correlates error information with that of other agents and the method returns to step 88.

Returning to steps 96 and 97, if the first error in the current node module 12sn is not internal or external, the method proceeds to step 102.

In step 102, error precedence software 36 determines whether the first error in the current node module 12sn is propagated. If the error is propagated, the method proceeds to step 108 of FIG. 3C. If the first error is not propagated, the method proceeds to step 106 in which node module counter n is incremented, and the method returns to step 88.

With reference to FIG. 3C, error precedence software 36 examines error precedence modules within processor modules on Node Buses A-x or Node Buses B-y, where x is the number of Node Buses on System Bus A and y is the number of Node Buses on System Bus B.

In step 108, error precedence software 36 initializes a processor module counter p to '1'.

In step 110, error precedence software 36 determines whether the processor module counter p is greater than the number P of processors. If so, the method ends in step 66. If not, the method proceeds to step 114.

In step 114, error precedence software 36 determines whether the first error in the current processor module 18snp to be examined is internal. If the first error is internal, error precedence software 36 obtains the first error results from processor module 18snp and the method ends in step 66. If not, the method proceeds to step 118.

In steps 118 and 119, error precedence software 36 determines whether the first error in the current processor module 18snp is external, and whether the CPU Bus or the Node Bus saw the error first. If the first error is external and the CPU Bus saw the error first, the current error precedence module 16snp observed an external error on the interface between hierarchies. Error precedence software 36 correlates error information with that of other agents in step 120 and obtains the first error results from processor module 18snp in step 116. The method ends in step 66.

Returning to steps 118 and 119, if the first error is external and the Node Bus saw the error first, the method proceeds to step 122 in which error precedence software 36 increments the processor module counter p and correlates error information with that of other agents. The current error precedence module 22sn observed an external error on the interface between hierarchies. The method returns to step 110.

Returning to step 118, if the first error in the current processor module 18snp is not internal or external, the method proceeds to step 124, in which the processor module counter p is incremented, and the method returns to step 110.

Thus, error processing software 36 is able to pinpoint the first error (i.e., the data parity error) in the system, even though the first error propagated to Node Bus A-1 and System Bus A and may have spawned other types of errors. Using this example, if a processor connected to System Bus B also read the same line, this would yield data parity errors being reported throughout the System Bus B hierarchy. The error precedence modules still allow error processing software 36 to properly identify the initial error and correctly identify the bad CPU Module on System Bus A. Without error precedence determining circuitry, the identification of the first error in system 10 would be complicated or impossible.

Although the present invention has been described with particular reference to certain preferred embodiments thereof, variations and modifications of the present invention can be effected within the spirit and scope of the following claims.

We claim:

1. A diagnostic system for determining the order of occurrence of errors in a split transaction bus architecture computer system comprising:

first means coupled between first and second split transaction bus architecture system buses for recording and ordering errors that occur on the first split transaction bus architecture system bus with errors that occur on the second split transaction bus architecture system bus; and second means coupled between split transaction bus architecture node buses and the split transaction bus architecture system buses for recording and ordering errors that occur on the first and second split transaction bus architecture system buses with errors that occur on the split transaction bus architecture node buses;

third means coupled between the split transaction bus architecture node buses and split transaction bus architecture processor buses for recording and ordering errors that occur on the split transaction bus architecture processor buses with errors that occur on the split transaction bus architecture node buses; and diagnostic processing circuitry for reading the errors stored within the First, second, and third recording means, and for determining a first error to occur, including JTAG circuitry coupled to the diagnostic processor for reading the errors stored within the recording means.

2. A split transaction bus architecture computer system comprising:

first and second system buses;

a plurality of node buses coupled to the system buses;

a plurality of processor buses coupled to the node buses;

a plurality of processors coupled to the processor buses;

a memory coupled to the system buses; and a diagnostic system for determining the order of occurrence of errors in the split transaction bus architecture computer system including first means coupled between the first and second system buses for recording and ordering errors that occur on the first system bus with errors that occur on the second system bus;

second means coupled between the node buses and the system buses for recording and ordering errors that occur on the first and second system buses with errors that occur on the node buses;

third means coupled between the node buses and the processor buses for recording and ordering errors that occur on the processor buses with errors that occur on the node buses; and diagnostic processing circuitry for reading the errors stored within the first, second, and third recording means, and for determining a first error to occur, including JTAG circuitry coupled to the diagnostic processor for reading the errors stored within the recording means.

3. A method of identifying a first error to occur out of a plurality of errors in a split transaction bus architecture computer system comprising the steps of:

polling first error precedence modules coupled to first and second system buses and to first memory modules;

determining one of the first error precedence modules which recorded the first error;

determining from the one first error precedence module whether the first error is internal;

if the first error is internal, then identifying the first error from information in one of the first memory modules coupled to the one first error precedence module;

if the first error is not internal, then determining which one of the system buses recorded the first error;

polling second error precedence modules coupled between the one system bus and a plurality of node buses;

determining one of the second error precedence modules which recorded the first error;

determining from the one second error precedence module whether the first error is internal;

if the first error is internal, then identifying the first error from information provided through one of the node buses coupled to the one second error precedence module;

if the first error is not internal, then polling third error precedence modules coupled between the one node bus and a plurality of processor buses;

determining one of the third error precedence modules which recorded the first error; and identifying the first error from information provided through one of the processor buses coupled to the one-third error precedence module.

* * * * *